US010026099B1

(12) United States Patent
Joshi et al.

(10) Patent No.: US 10,026,099 B1
(45) Date of Patent: Jul. 17, 2018

(54) COMPUTERIZED WAITING LIST TRACKING SYSTEM

(71) Applicant: Amazon Technologies, Inc., Seattle, WA (US)

(72) Inventors: Siddharth Vivek Joshi, Seattle, WA (US); David Aronchick, Seattle, WA (US); James Robert Blair, Seattle, WA (US); Canku Alp Calargun, Redmond, WA (US); Hyma Srinivasa Murthy, Redmond, WA (US); Vishal Bethur Sathyamurthy, Bothell, WA (US); Scott Kerns Windsor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 589 days.

(21) Appl. No.: 14/570,799

(22) Filed: Dec. 15, 2014

(51) Int. Cl.
*G06Q 10/02* (2012.01)
*G06Q 30/02* (2012.01)
*G06Q 50/12* (2012.01)

(52) U.S. Cl.
CPC ..... *G06Q 30/0261* (2013.01); *G06Q 30/0207* (2013.01); *G06Q 30/0251* (2013.01); *G06Q 10/02* (2013.01); *G06Q 50/12* (2013.01)

(58) Field of Classification Search
CPC .... G06Q 10/02; G06Q 50/12; G06Q 30/0207; G06Q 30/0251; G06Q 30/0261
See application file for complete search history.

(56) References Cited

U.S. PATENT DOCUMENTS

| | | | |
|---|---|---|---|
| 7,099,925 B1 * | 8/2006 | Nolan | G06F 17/30902 705/5 |
| 2004/0161097 A1 * | 8/2004 | Henry | G06Q 10/02 379/266.02 |
| 2006/0109811 A1 * | 5/2006 | Schotten | G01S 1/68 370/328 |
| 2012/0116863 A1 * | 5/2012 | Boss | G06Q 30/0235 705/14.35 |

(Continued)

OTHER PUBLICATIONS

Susskind et. al "An Evaluation of Guests' Preferred Incentives to Shift Time-Variable Demand in Restaurants"; Cornell Hospital Quarterly vol. 43, Issue 1, 2004; avail. at: https://scholarship.sha.cornell.edu/cgi/viewcontent.cgi?referer=https://www.google.com/& httpsredir=1&article=1382&context=articles (Year: 2004).*

*Primary Examiner* — Kevin H Flynn
*Assistant Examiner* — Emmett K. Walsh
(74) *Attorney, Agent, or Firm* — Lee & Hayes, PLLC

(57) ABSTRACT

Tracking waiting lists associated with merchants and presenting deals to users based on adding the users to waiting lists is described. A service provider may enable merchants to track waiting lists associated with their own services and services of other merchants. Users may be automatically added to waiting lists of merchants based at least in part on a service provider determining that a user is at a geographic location of a merchant. Based at least in part on adding a user to a waiting list for a particular merchant, the service provider may access and select deals from one or more alternative merchants. The one or more alternative merchants may not have waiting lists or may have waiting lists with fewer groups than the waiting list for the particular merchant. The service provider may offer the deals to the user via a user device.

20 Claims, 8 Drawing Sheets

(56) References Cited

U.S. PATENT DOCUMENTS

| | | | |
|---|---|---|---|
| 2013/0332208 A1* | 12/2013 | Mehta | G06Q 10/02 705/5 |
| 2015/0025919 A1* | 1/2015 | West | G06Q 10/02 705/5 |
| 2015/0081348 A1* | 3/2015 | Avera | G06O 30/0269 705/5 |

* cited by examiner

COMPUTERIZED WAITING LIST TRACKING SYSTEM

BACKGROUND

Often times, demands for specific merchant services exceed an availability of the merchant services. For example, restaurants may not have enough tables to accommodate a number of parties who are interested in dining at a particular restaurant at a particular time. Similarly, beauty service providers (e.g., wax bars, nail salons, etc.) may not have enough service stations or employees to accommodate all of the patrons who desire a particular beauty service at a particular time. Accordingly, during busy times, many merchants use a mechanism for tracking groups of individuals that are interested in their service. For example, some merchants maintain a running list of groups who are interested in a particular service at a particular time. The running list may be called a waiting list. The waiting list may be managed via a pen-and-paper system or an electronic system manually maintained by a hostess, receptionist, or manager of the merchant. As services become available (e.g., a table at a restaurant clears, a manicure station at a nail salon opens up, etc.), the hostess, receptionist, or manager moves through the waiting list on a first-come-first-served basis.

DESCRIPTION OF FIGURES

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
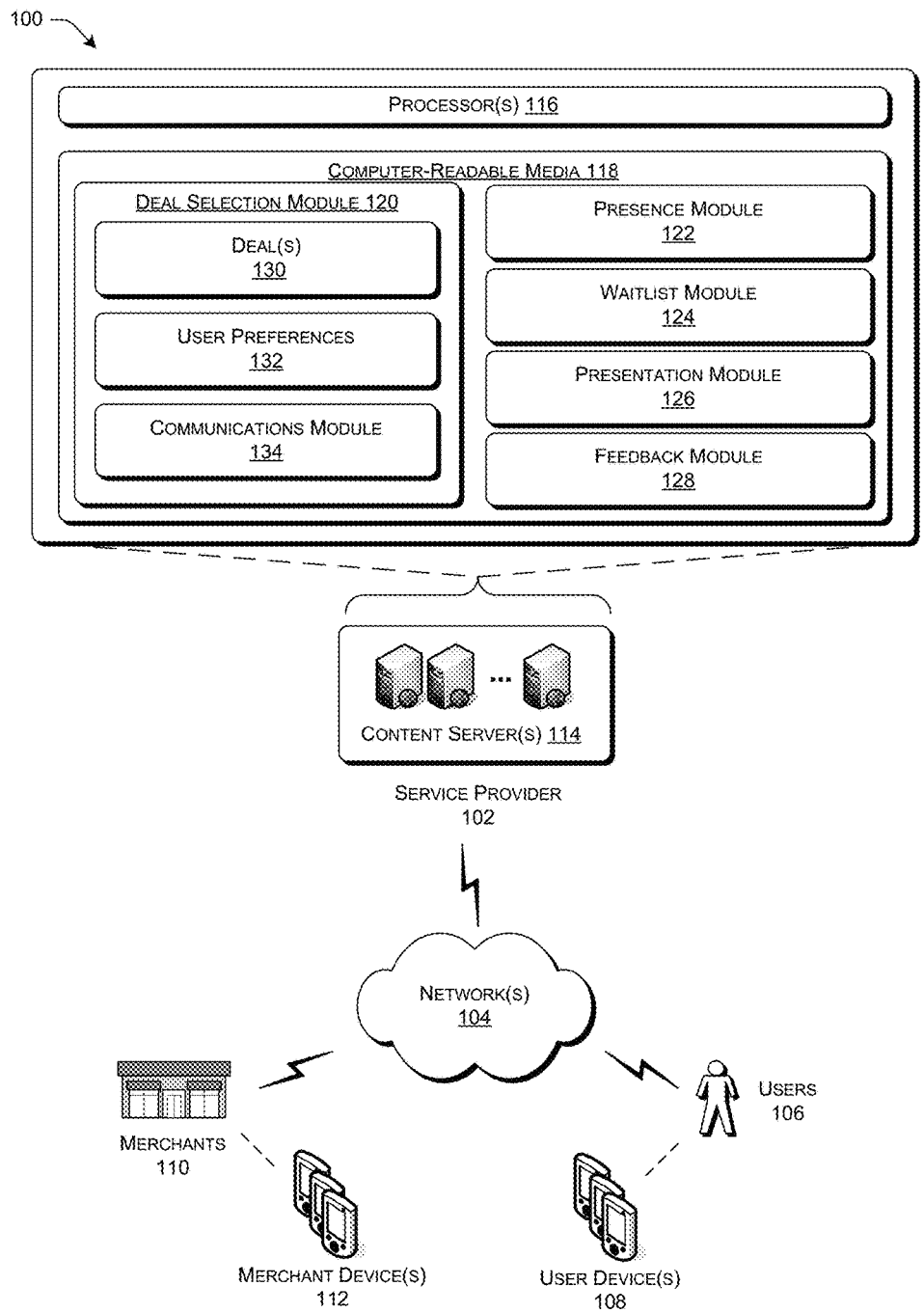
FIG. 1 is a diagram showing an example system for tracking waiting lists associated with merchants and presenting deals to users.

This disclosure describes systems and processes for tracking waiting lists associated with a plurality of merchants and presenting deals to a user based at least in part on adding the user to a waiting list for at least one of the merchants. More particularly, as opposed to users remaining on waiting lists for a period of time determined by a merchant associated with the waiting list, a service provider may offer users one or more deals from alternative merchants. The alternative merchants may not have waiting lists or may have waiting lists with fewer groups on the waiting lists than the waiting list for the merchant. Upon receiving an indication that the user acquired one or more of the deals from the alternative merchants, the service provider may remove the user from the waiting list.

Typically, demands for merchant services exceed an availability of the merchant services. However, many consumers are willing to wait until the merchant is available to perform the merchant services. Accordingly, during busy times, many merchants use a mechanism for tracking individual consumers and/or groups of consumers that are interested in their service and willing to wait for the service. For example, some merchants maintain a running list of individual consumers and/or groups of consumers that are interested in a particular service at a particular time. The running list may be called a waiting list. The waiting list may be managed via a pen-and-paper system or an electronic system manually maintained by a hostess, receptionist, or manager of the merchant. As services become available (e.g., a table at a restaurant clears, a manicure station at a nail salon opens up, etc.), the hostess, receptionist, or manager moves through the individual consumers and/or groups on the waiting list on a first-come-first-served basis.

Current waiting list management and tracking systems are difficult to manage and are frustrating for consumers who often times are unaware of the number of individual consumers and/or groups that are ahead of them and/or how much longer they should expect to wait. Consumers regularly pester the hostess, receptionist, or manager requesting updates on their wait time and/or their position on the waiting list. In at least some examples, a consumer is required to leave a physical location of a merchant where he or she has been added to a waiting list in order to determine whether other merchants have more availability and/or the ability to perform the service for the customer at an earlier time. The consumer may be removed from the waiting list if he or she leaves the physical location of the merchant or if a device associated with the consumer is determined to be greater than a threshold distance from the physical location of the merchant. Although some consumers may be willing to spend time and energy waiting on waiting lists, many consumers find this process to be inconvenient, time-consuming, and/or frustrating. The systems and processes described herein optimize managing and tracking waiting lists and enable merchants to present one or more deals to consumers who have been added to a waiting list, which may optimize user access to the merchants' services.

To reduce the burden on consumers who are interested in services provided by merchants, a service provider may optimize managing and tracking waiting lists. The service provider may enable merchants to present one or more deals to consumers who have been added to a waiting list, which may optimize user access to the merchants' services. The service provider may enable merchants to track waiting lists associated with their own services and the services of other merchants that may offer similar products and/or services. Users may be automatically added to a waiting list of a merchant based at least in part on the service provider determining that a user device corresponding to a user is within a predetermined distance of a geographic location of the merchant (e.g., within a threshold distance from the geographic location of the merchant). Users may opt into receiving updates that relay real-time information, such as a user's position on a waiting list, wait time remaining, etc.

Based at least in part on a user being added to a waiting list for a particular merchant, the service provider may select and access deals from one or more alternative merchants. The one or more alternative merchants may not have waiting lists or may have waiting lists with fewer groups waiting than the waiting list for the particular merchant. Deals from the one or more alternative merchants may be selected based at least in part on whether the one or more alternative merchants are within a predetermined distance of the physical location of the particular merchant, offer a same type of service, offer a same genre of service, and/or match user preferences of the user. The service provider may offer the deals to the user by presenting the deals via a user device. Then, in at least some examples, if the user acquires one or more of the deals, the service provider may remove the user from the waiting list for the particular merchant.

For example, a user may be walking along a street with several restaurants. When a user device associated with the user is determined to be within a threshold distance of a particular restaurant (e.g., a restaurant that serves Mexican food) that subscribes to the service provider described below, the user my receive a notification asking whether he or she would like to be added to a waiting list for that restaurant. If the user would like to be added to the waiting list, the user may so indicate. Once the user is added to the waiting list, the user may receive deals related to that particular restaurant. The user may also receive deals to other nearby restaurants and/or other restaurants that serve Mexican food. For instance, such restaurants may be those that do not currently have a waiting list and/or have a waiting list that is shorter than the waiting list that the user is currently on. If the user acquires one of the deals from a different restaurant, thereby indicating that the user likely is not interested in eating at the restaurant, the service provider may remove the user from the waiting list for that restaurant.

As another example, a user may walk into a nail salon for a manicure. All of the nail technicians may be busy with other customers. Accordingly, the user may be added to a waiting list for the next available nail technician. While the user waits, the user may receive deals from other nail salons where the user can receive his or her manicure without waiting. If the user acquires one of the deals from one of the other nail salons, the user may be removed from the waiting list.

FIG. 1 is a diagram showing an example system 100 for tracking waiting lists associated with a plurality of merchants and presenting deals to a user based at least in part on adding the user to a waiting list for at least one of the merchants. More particularly, the system 100 may include a service provider 102, one or more network(s) 104, one or more users 106, one or more user device(s) 108 associated with the users 106, one or more merchants 110, and one or more merchant device(s) 112 associated with the merchants 110.

As shown, the service provider 102 may include one or more content server(s) 114, which may include one or more processor(s) 116 and computer-readable media 118. The computer-readable media 118 may include a deal selection module 120, a presence module 122, a waitlist module 124, a presentation module 126, and a feedback module 128. Moreover, the deal selection module 120 may maintain or at least be associated with one or more deals 130 and user preferences 132. The deal selection module 120 may include a communications module 134.

In various examples, the service provider 102 may offer items and/or deals, such as the deals 130, to the users 106, where the items and/or the items featured in the deals may be offered on behalf of the merchants 110. The deals and/or the items may be presented to the users 106 via one or more communication channels, such as a site (e.g., a website) associated with the service provider 102, e-mail messages, text messages, an application (e.g., a mobile application) residing on a user device 108, a social network, and so on. Moreover, the deals 130 may be acquired and/or redeemed utilizing these communication channels. For instance, the users 106 may acquire a deal 130 via the website of the service provider 102 or a mobile application that is associated with the service provider 102 and that resides on a user device 108 of the user 106.

The service provider 102 may be any entity, server(s), platform, etc., that offers items (e.g., products, services, etc.) and/or deals 130 for acquisition to consumers (e.g., users 106). For example, the service provider 102 may be associated with a merchant marketplace (e.g., a website) that allows consumers to search, browse, view and/or acquire (i.e., purchase) items or deals 130 offered for sale directly by the service provider 102 or offered for sale by the service provider 102 on behalf of merchants 110 and/or other entities (e.g., a deal provider). The service provider 102 may also obtain/receive and maintain information, interests, preferences, etc., about the merchants 110, actual or potential customers (i.e., users 106), etc., for the purpose of presenting the most relevant items, deals 130, advertisements, etc., to users 106.

In various examples, the service provider 102 may provide deals 130 to consumers (e.g., users 106) on behalf of the merchants 110 and/or deal providers. The service provider 102 described herein may offer deals 130 that promote or feature merchants 110 and/or merchant items. The service provider 102 may recommend deals 130 to customers (e.g., users 106) based on a variety of factors. For example, the service provider 102 may observe user 106 information and actions associated with a retail purchase account associated with a user 106 (e.g., purchases, sales, items on a saved-items list (i.e., a wish-list), browsing history, search history, recommendations, personal demographic information, location proximity, calendar information, etc.) when recommending deals 130 to the customer (e.g., user 106). In another example, the service provider 102 may access and observe user information and actions associated with third party sources and systems (e.g., social networks, professional networks, partner webstore purchases, etc.) when recommending deals 130 to a user 106. Therefore, the service provider 102 may prioritize deals 130 based on user information and actions described above such that more relevant deals 130 are provided to a user.

In some examples, the network(s) 104 may be any type of network known in the art, such as the Internet. Moreover, the service provider 102, the user device(s) 108, and/or the merchant device(s) 112 may communicatively couple to the network(s) 104 in any manner, such as by a wired or wireless connection. The network(s) 104 may facilitate communication between the content servers 114, the user device(s) 108 associated with the users 106, and/or the merchant device(s) 112 associated with the merchants 110.

In some examples, the users 106 may operate corresponding user device(s) 108 to perform various functions associated with the user device(s) 108, which may also include one or more processor(s), computer-readable media, and a display. Furthermore, the users 106 may utilize the user device(s) 108 to browse, search, view, acquire, etc., items and/or deals 130 offered for sale by the service provider 102 and/or the merchants 110. The items and/or the deals may be offered to the users 106 in any manner, such as via a site (e.g., a website), an e-mail message, an application associated with a user device 108, a text message, a telephone call, a social network, or any other manner.

In various examples, the one or more merchants 110 may be any individual or entity that is a source or a distributor of items (e.g., products, services, etc.) and/or deals 130 that may be acquired by the users 106. For example, the merchants 110 may include entities that provide products or services to consumers, which may be offered or promoted directly by the merchants 110 or by the service provider 102 on behalf of the merchants 110. The merchants 110 may also offer those items and/or deals via a physical location (e.g., a brick-and-mortar store) or a merchant-branded merchant site (e.g., website). The merchants 110 may provide items or deals 130 to the users 106 with the assistance of one or more merchant device(s) 112, which may include any type of device (e.g., a laptop computer, a tablet device, a mobile telephone, etc.), which may include one or more processor(s), computer-readable media, and a display. Moreover, the merchants 110 may interact with the service provider 102 via a site (i.e., a website), a self-service merchant portal, a self-service interface, or in any other manner. For the purposes of this discussion, the merchants 110 may offer services with limited availability (e.g., restaurants, health and beauty salons, pharmacies, governmental offices, theme parks, etc.). When a merchant 110 does not have availability to perform a service for one or more users 106 at a particular time, the merchant 110 may add the one or more users 106 to a waiting list, as described above.

The service provider 102 may be any entity, server(s), platform, etc., that tracks waiting lists associated with merchants 110 and presents deals to users 106 based at least in part on adding users 106 to a waiting list for at least one of the merchants 110. The service provider 102 may integrate electronic reservation lists and/or waiting lists associated with the merchants 110 with the waiting lists described herein to provide real-time updates on availability (e.g., which tables are open, which tables are about to leave, which tables are reserved, etc.), position on the waiting list, and/or wait time.

Moreover, and as shown, the service provider 102 may include one or more content servers 114, which may include one or more processors 116 and computer-readable media 118. The computer-readable media 118 may include, or be associated with, the deal selection module 120, which may maintain the deals(s) 130, the user preferences 132, the communications module 134, the presence module 122, the waitlist module 124, the presentation module 126, and the feedback module 128. The content servers 114 may also include additional components not listed above that may perform any function associated with the content servers 114. In various examples, each of the content servers 114 may be any type of server, such as a network-accessible server.

In various examples, the processor(s) 116 may execute one or more modules and/or processes to cause the content servers 114 to perform a variety of functions, as set forth above and explained in further detail in the following disclosure. In some examples, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. Depending on the exact configuration and type of the content servers 114, the computer-readable media 118 may include volatile memory (such as RAM), non-volatile memory (such as ROM, flash memory, miniature hard drive, memory card, or the like), or some combination thereof. The computer-readable media 118 may be non-transitory computer-readable media 118.

For the purposes of this discussion and as discussed above, the service provider 102 may offer items, advertisements and/or deals (i.e., the deals 130) on behalf of itself, the merchants 110, and/or a deal sourcer (e.g., a deal providers). In various examples, a deal sourcer may include any entity that aggregates deals from any number of merchants 110 and provides those deals to an entity, such as the service provider 102, which may then offer those deals to consumers (e.g., users 106). Furthermore, the deals 130 may represent some form of value to be applied when items are acquired by individuals in association with the advertisements or deals 130, such as a discount, a coupon, a credit, a rebate, and the like. The deals 130 may also represent an offer and/or promotion to acquire one or more items associated with the deals 130. The deals 130 may also be offered at any price point, including being offered at no cost, such as the users 106 being offered a deal 130 that includes an item at no additional cost to the user 106. In addition, the advertisements may identify, feature and/or promote items or deals 130, or the merchants 110 that offer those items or deals 130. The items offered in association with the advertisements or deals 130 may include tangible items, intangible items, products, goods, services, a bundle of items, digital goods, digital services, events, and the like.

The items and/or deals 130 provided by the service provider 102 and/or the merchants 110 may be acquired by the users 106 via one or more physical locations, via one or more sites (e.g., a site of the merchant 110, an online retailer site, websites, etc.), via any type of user device 108, at the point of a transaction or interaction with a merchant 110, or combinations thereof. The merchants 110 and/or the service provider 102 may also provide items and/or deals 130 acquired by individuals to locations specified by the individuals, such as via mobile services, delivery, etc. In addition, the acquisition of items and/or deals 130 from merchants 110 by individuals via the service provider 102 may be achieved through various means of providing value for the items and/or deals 130, such as purchasing, renting, leasing, borrowing, trading, bartering, etc., items and/or deals 130.

In various examples, the deal selection module 120 may receive and store deals 130 offered by the merchants 110 and may leverage user preferences 132 and other data (e.g., waitlist data, feedback data, presence data, etc.) to select deals 130 for offering and presenting to a user 106. As described above, the deal selection module 120 may maintain or at least be associated with one or more deals 130. The deal selection module 120 may maintain the plurality of deals in any type of deal repository, such as a database, memory cache, or any other structure or storage mechanism that is capable of storing digital items (e.g., deals, audio files, video files, images, etc.). The merchants 110 may provide deals 130 to the service provider 102 for ultimately presenting the deals 130 to the users 106. The merchants 110 may provide items or deals to the service provider 102 with the assistance of one or more merchant device(s) 112, as described above. The merchants 110 may provide merchant inputs (i.e., deal parameters) associated with a deal 130 to the service provider 102. For example, merchants 110 may provide deal parameters that include, but are not limited to, the items (e.g., products, services, etc.) included in the deal 130, the price, the discount being applied, redemption locations, a redemption period (i.e., a period of time in which a user 106 may redeem the deal 130), a structure of the deal 130, a format of the deal 130 (e.g., text versus graphics/symbols), a visual appearance of the deal 130, (e.g., text, symbols, colors, images, etc., to be displayed with the deal 130), users 106 or groups of users 106 that are to receive the deal 130, and any other terms or conditions associated with the deal 130. The deal selection module 120 may store the deals 130 for a predetermined period of time, as determined by the parameters provided by the merchants 110.

The deal selection module 120 may also maintain or at least be associated with user preferences 132, as described above. The user preferences 132 may be explicit or implied. For example, user preferences 132 may be explicit based on information and/or preferences a user 106 may input when he or she sets up a user account or profile for interacting with the service provider 102. The user 106 may provide personal demographic information (gender, age, profession, etc.), calendar information (birthdays, holidays, anniversaries, etc.), etc. Additionally, the user preferences 132 may be implied based on the service provider 102 observing user information and actions associated with a retail purchase account associated with a user 106 (e.g., purchases, sales, items on a saved-items list (i.e., a wish-list), browsing history, search history, recommendations, location proximity, etc.). Moreover, user preferences 132 may be implied based on the service provider 102 observing characteristics of one or more deals 130 previously acquired by the user 106. In another example, user preferences 132 may be implied based on the service provider 102 accessing and observing user information and actions associated with third party sources and systems (e.g., social networks, professional networks, partner webstore purchases, etc.).

The deal selection module 120 may also include a communications module 134. The communications module 134 may receive waitlist data from the waitlist module 124 and/or feedback data from the feedback module 128. The communications module 134 may provide the waitlist data and/or the feedback data to the deal selection module 120. The deal selection module 120 may leverage the waitlist data, feedback data, and user preferences 132 to select one or more deals 130 for offering to a user 106.

Moreover, the presence module 122 may detect a presence of a user 106 within a predetermined proximity of a geographic location of a merchant 110. The presence module 122 may determine that a user device 108 associated with the user 106 is within a threshold distance of a geographic location of a merchant 110. Each merchant 110 may have a predetermined distance surrounding the physical location of the merchant 110 that may be used for determining the presence of the user 106 at the geographic location of the merchant 110. The presence module 122 may determine that the user device 108 is within a threshold distance of a geographic location of a merchant 110 based at least in part on receiving an indication that a user device 108 is within the predetermined distance for a predetermined period of time. Additionally or alternatively, the presence module 122 may determine that the user device 108 is within a threshold distance of a geographic location of a merchant 110 based at least in part on receiving an indication that the user device 108 establishes a connection to a network (e.g., a Wi-Fi network) associated with a merchant 110. In some examples, the presence module 122 may determine that the user device 108 is within a threshold distance of a geographic location of a merchant 110 based on user device 108 interaction with a Quick Response (QR) Code, etc.

The waitlist module 124 may control and/or manage waiting lists for each of the merchants 110. Waiting lists may include lists of groups that are waiting for access to services provided by the merchants 110. Groups include one or more consumers (e.g., users 106 and/or people associated with a user 106) who are waiting for services to be performed by the merchants 110. The waitlist module 124 may control the waiting lists by adding, maintaining, and/or removing groups. The groups may be added to a waiting list on a first-come-first-served basis. The waitlist module 124 may also monitor waiting lists associated with one or more merchants 110 and may provide at least some information about the waiting lists to individual merchants 110 of the one or more merchants 110. For instance, the waitlist module 124 may provide waitlist data (e.g., number of groups, sizes of groups, current wait time, etc.) for a particular merchant of the one or more merchants 110 to alternative merchants of the one or more merchants 110. The waitlist module 124 also may send waitlist data to the communications module 134 for triggering deal selection by the deal selection module 120.

The presentation module 126 may receive deals 130 from the deal selection module 120. The presentation module 126 may offer the deals 130 to the user 106. The deals 130 may be offered to the users 106 in any manner, such as via a site (e.g., a website), an e-mail message, an application associated with a user device 108, a text message, a telephone call, a social network, or any other manner.

The feedback module 128 may receive feedback data from a user device 108. The feedback data may indicate whether a user 106 acquires a deal 130, redeems a deal 130, requests a refund for a deal 130, etc. More specifically, the feedback data may indicate whether the user 106 acquires any of the deals 130 offered by the presentation module 126 based at least in part on the user 106 being added to a waiting list. The feedback module 128 may send the feedback data to the waitlist module 124 and the waitlist module 124 may leverage the feedback data to determine whether to remove the user 106 from the waiting list or maintain the user's 106 current position on the waiting list. Additionally or alternatively, the feedback module 128 may send the feedback data to the communications module 134 and the communications module 134 may leverage the feedback data for selecting one or more deals 130 via the deal selection module 120.

Figure 2:
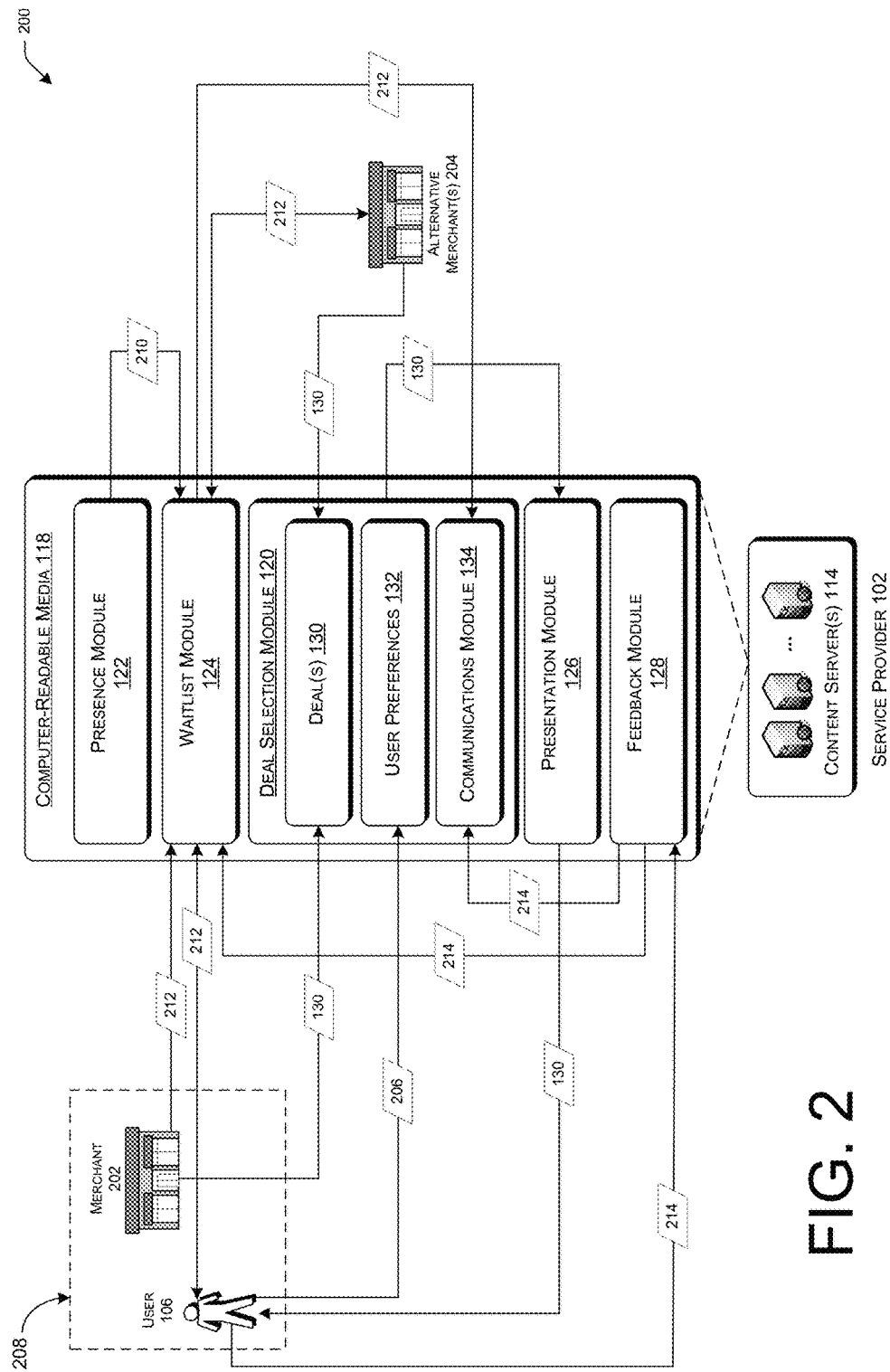
FIG. 2 is a diagram showing an example system for tracking waiting lists associated with merchants and presenting deals to users.

FIG. 2 is a diagram showing an example system 200 for tracking waiting lists associated with a plurality of merchants 110 and presenting deals 130 to a user 106 based at least in part on adding the user 106 to a waiting list for at least one of the merchants 110. As shown in FIG. 2, the plurality of merchants 110 may include a merchant 202 and one or more alternative merchants 204. For the purposes of this discussion, merchant 202 is the merchant 110 where the user 106 is located (e.g., the user device 108 associated with the user 106 is within a predetermined distance from the physical location of the merchant 110), as discussed below.

As described above, the deal selection module 120 may maintain or at least be associated with user preferences 132. The user preferences 132 may be explicit or implied and may be accessed based at least in part on accessing a cookie stored on the user device 108, authenticating a session based on user 106 authentication, etc. For example, a user 106 may provide user data 206 including information and/or preferences when he or she sets up a user account or profile for interacting with the service provider 102. The user 106 may provide personal demographic information (gender, age, profession, etc.), calendar information (birthdays, anniversaries, etc.), etc. As also described above, user preferences 132 may be implied based on the service provider 102 observing user 106 information and actions associated with a retail purchase account associated with a user 106 (e.g., purchases, sales, items on a saved-items list (i.e., a wish-list), browsing history, search history, recommendations, location proximity, etc.). In another example, user preferences 132 may be implied based on the service provider 102 accessing and observing user information and actions associated with third party sources and systems (e.g., social networks, professional networks, partner webstore purchases, etc.).

In various examples, the deal selection module 120 may maintain or at least be associated with one or more deals 130. The merchant 202 and the one or more alternative merchants 204 may provide deals 130 to the service provider 102 for ultimately presenting the deals 130 to the users 106, as described above. The deal selection module 120 may store the deals 130 for a predetermined length of time, as described above.

The presence module 122 may detect a presence of a user 106 (via a corresponding user device 108) within a geographic proximity of the merchant 202. The merchant 202 may have a predetermined distance surrounding the physical location of the merchant 202 that may be used for determining the presence of the user 106 at the geographic location of the merchant 202. The predetermined distance surrounding the physical location of the merchant 202 is illustrated by a rectangle 208 around the user 106 and the merchant 202. The presence module 122 may determine that the user 106 is within the predetermined distance of the geographic location of the merchant 202 based at least in part on receiving an indication that a user device 108 associated with the user 106 is within the predetermined distance for a predetermined period of time. Additionally or alternatively, the presence module 122 may determine that the user 106 is within the predetermined distance of the geographic location based at least in part on receiving an indication that a user device 108 associated with a user 106 establishes a connection to a network (e.g., a Wi-Fi network) associated with the merchant 202. In some examples, the presence module 122 may determine that the user 106 is within the predetermined distance of the geographic location based on user device 108 interaction with a Quick Response (QR) Code, etc. The presence module 122 may provide presence data 210 to the waitlist module 124 and/or other modules.

The waitlist module 124 may control and/or manage waiting lists for each of the merchants (e.g., merchant 202 and/or alternative merchants 204). The waitlist module 124 may control the waiting lists by adding groups to the waiting lists. The groups may be added to a waiting list on a first-come-first-served basis. In some examples, the waitlist module 124 may leverage the presence data 210 for controlling and/or managing waiting lists associated with the merchants (e.g., merchant 202 and/or alternative merchants 204). For instance, the waitlist module 124 may receive presence data 210 indicating that a user 106 is at a geographic location of a merchant 202. The waitlist module 124 may send a prompt to the user 106 inquiring whether the user would like to be added to the waiting list associated with the merchant 202. The prompt may be provided to the user 106 in any manner, such as via a site (e.g., a website), an e-mail message, an application associated with a user device 108, a text message, a telephone call, a social network, or any other manner. In some examples, the prompt may include a request for a number of people in the user's 106 group and additional information (e.g., dining preferences, special instructions, etc.). The waitlist module 124 may receive waitlist data 212 indicating that the user 106 wants to be added to the waiting list for the merchant 202. Responsive to receiving the indication, the waitlist module 124 may add the user 106 to the waiting list for the merchant 202.

In other examples, the waitlist module 124 may receive an indication of a noteworthy date (e.g., birthday, anniversary, special occasion, etc.) and the waitlist module 124 may send the user 106 a prompt as described above. In yet other examples, a user 106 may add his or her name (representative of his or her group) to a waiting list via a site (e.g., a website), an e-mail message, an application associated with a user device 108, a text message, a telephone call, a social network, in person, or any other manner. In additional or alternative examples, a user 106 may use any combination of the above to add his or her name (representative of his or her group) to waiting lists for one or more merchants 110. Based at least in part on a user 106 being added to a waiting list, the waitlist module 124 may access user preferences 132 (e.g., via a cookie, authenticated user session, etc.) indicating specific preferences of the user 106 such as whether the user 106 prefers a window seat, whether the user 106 prefers a booth or a table, whether the user 106 is celebrating a special occasion (e.g., birthday, anniversary), etc.

The waitlist module 124 may send an additional prompt to the user 106 to determine whether the user 106 would like to receive subsequent notifications based at least in part on the user 106 being added to the merchant's 202 waiting list. The prompt may be sent via various mediums, such as via a site (e.g., a website), an e-mail message, an application associated with a user device 108, a text message, a telephone call, a social network, or any other manner. The subsequent notifications may include waitlist data 212 such as real time updates identifying a number of groups that are ahead of the user 106 (and his or her group) on the waiting list for the merchant 202, an estimation of a wait time for the user 106 (and his or her group) on the waiting list for the merchant 202, deals 130 offered by the merchant 202, any changes that may happen, etc. In some examples, the user 106 may opt in for subsequent notifications at the same time that he or she requests to be added to the waiting list for the merchant 202. The waitlist module 124 may send the user 106 a notification via various mediums, such as via a site (e.g., a website), an e-mail message, an application associated with a user device 108, a text message, a telephone call, a social network, or any other manner, when it is the user's 106 turn to receive the service from the merchant 202.

The waitlist module 124 may manage and/or control the waiting lists by removing groups from the waiting lists. The waitlist module 124 may remove groups from waiting lists for various reasons. In at least one example, the waitlist module 124 may receive an indication that the user acquired a deal 130 from one of the one or more alternative merchants 204 and based at least in part on receiving the indication, the waitlist module 124 may remove the user 106 (or the group associated with the user 106) from the waiting list. In some examples, the waitlist module 124 may leverage parameters to enable the user 106 to purchase deals 130 from one or more alternative merchants 204 and/or be added to waiting lists for alternative merchants 204 while maintaining the user's 106 position on the merchant's 202 waiting list. Based at least on the parameters, the waitlist module 124 may not remove the user 106 unless or until the user 106 has acquired a number of deals over a predetermined threshold and/or has added his or her name to a number of waiting lists above a predetermined threshold.

In other examples, the waitlist module 124 may remove the user 106 from the waiting list based at least in part on the user 106 leaving the geographic location of the merchant 202 (e.g., no longer in proximity to the geographic location of the merchant 202). For instance, the waitlist module 124 may receive presence data 210 from the presence module 122 indicating that the user device 108 associated with the user 106 is no longer within the predetermined distance of the physical location of the merchant 202 or that the user device 108 is no longer connected to the merchant's 202 network. Additionally or alternatively, the waitlist module 124 may remove a user 106 from the waiting list if a predetermined period of time lapses from the time the user 106 was added to the waiting list or if the user 106 and/or merchant 202 manually removes the user 106 from the waiting list. In at least some examples, the waitlist module 124 may send the user 106 a prompt via the user device 108 requesting that the user 106 confirm that he or she would like to be removed from the waiting list for the merchant 202.

The waitlist module 124 may also monitor waiting lists associated with one or more merchants 110 and may provide at least some information about the waiting lists to the one or more merchants 110. For instance, the waitlist module 124 may provide waitlist data 212 (e.g., number of groups on a waiting list, sizes of groups on a waiting list, current wait time, etc.) for the merchant 202 to one or more of the alternative merchants 204, and vice versa. Merchants 110 that do not have waiting lists or have waiting lists with fewer groups waiting than the waiting lists for other merchants 110 (e.g., alternative merchant(s) 204) may opt to send one or more deals 130 to users 106 on waiting lists of other merchants 110 (e.g., merchant 202). The merchants 110 that do not have waiting lists or have waiting lists with fewer groups waiting than the waiting lists for the other merchants 110 (e.g., alternative merchant(s) 204) may selectively identify users 106 for sending the one or more deals 130 or may send the one or more deals 130 to all users 106 on all waiting lists collectively. In some examples, the merchants 110 (e.g., alternative merchant(s) 204) may identify related deals 130 to present to users 106 on waiting lists in addition to offering one or more deals 130 from the merchant 110 (e.g., alternative merchant(s) 204). For instance, a merchant 110 (e.g., alternative merchant(s) 204) may identify a transportation deal 130 that may be presented with a deal 130 offered by the merchant 110 (e.g., alternative merchant(s) 204).

The waitlist module 124 may also send waitlist data 212 to the communications module 134 for triggering deal selection by the deal selection module 120. In at least one example, the waitlist module 124 may determine that at least one of the one or more alternative merchants 204 has no waiting list, has fewer groups on a waiting list than the merchant 202, and/or has an estimated wait time at or below a predetermined time. Based at least in part on determining that at least one of the one or more alternative merchants 204 has no waiting list, has fewer groups on a waiting list than the merchant 202, and/or has an estimated wait time at or below a predetermined time, the waitlist module 124 may send waitlist data 212 to the communications module 134 indicating that at least one of the one or more alternative merchants 204 has no waiting list, has fewer groups on a waiting list than the merchant 202, and/or has an estimated wait time at or below a predetermined time. In some examples, the waitlist data 212 may be sent based at least in part on a user 106 being added to the waiting list of the merchant 202. In other examples, the waitlist data 212 may be sent in predetermined time intervals. Additionally, the waitlist module 124 may send waitlist data 212 notifying the user 106 that at least one of the one or more alternative merchants 204 has no waiting list, has fewer groups on a waiting list than the merchant 202, and/or has an estimated wait time at or below a predetermined time. The notification may be part of the one or more deals 130 that may be presented to the user 106, as described below, or may be a separate notification provided via a site (e.g., a website), an e-mail message, an application associated with a user device 108, a text message, a telephone call, a social network, or any other form of communication.

The deal selection module 120 may leverage user preferences 132, waitlist data 212, feedback data 214, and/or other data (e.g., presence data 210, etc.) to select one or more deals 130. The communications module 134 may receive waitlist data 212 from the waitlist module 124 and/or feedback data 214 from the feedback module 128. The communications module 134 may provide the waitlist data 212 and/or feedback data 214 to the deal selection module 120.

In at least one example, the communications module 134 may receive waitlist data 212 indicating that the user 106 was added to a waiting list for the merchant 202. Such an indication may be considered a triggering event. Triggering events may initiate deal 130 selection in the deal selection module 120. As described above, adding a user 106 to a waiting list may be a triggering event. Additional or alternative triggering events may include detecting a presence of a user 106 within a predetermined distance of a geographical location of a merchant 110, an occurrence of a noteworthy date (e.g., birthday, anniversary, special occasion, etc.) specifically identified in a user's 106 calendar information associated with a user 106, etc.

Based at least in part on receiving the waitlist data 212 or any other data indicative of an occurrence of a triggering event, the deal selection module 120 may access the deals 130 that may be maintained or accessible by the deal selection module 120. In at least one example, based at least in part on receiving the waitlist data 212 indicating the user 106 was added to a waiting list of a merchant 202, the deal selection module 120 may identify one or more deals 130 offered by the merchant 202 and may send the one or more deals 130 offered by the merchant 202 to the presentation module 126.

The deal selection module 120 may also receive waitlist data 212 associated with one or more alternative merchants 204. The waitlist data 212 may indicate that individual alternative merchants 204 of the one or more alternative merchants 204 have no waiting lists, have waiting lists that have fewer groups ahead of the user 106 than the waiting list for the merchant 202, and/or have estimated wait times at or below a predetermined time. Based at least in part on receiving waitlist data 212 indicating that the individual alternative merchants 204 have no waiting lists, have waiting lists that have fewer groups waiting than the waiting list for the merchant 202, and/or have estimated wait times at or below a predetermined time, the deal selection module 120 may select one or more deals 130 offered by the individual alternative merchants 204 and may send the one or more deals 130 offered by the individual alternative merchants 204 to the presentation module 126. The presentation module 126 may present the one or more deals 130 to the user 106, as described above.

The deal selection module 120 may select the one or more deals 130 offered by the individual alternative merchants 204 based at least in part on whether the individual alternative merchants 204 are located within a predetermined distance of the merchant 202, whether the individual alternative merchants 204 offer the same services and/or products as the merchant 202, whether the individual alternative merchants 204 offer the same genre of services and/or products as the merchant 202, whether the individual alternative merchants 204 offer services and/or products that match the user preferences 132, etc. The individual alternative merchants 204 may offer the same services as the merchant 202 if both the individual alternative merchants 204 and the merchant 202 offer dining services (e.g., restaurants), spa services (e.g., massage parlor), beauty services (e.g., nail salon), etc. The individual alternative merchants 204 may offer services in the same genre as the merchant 202 if both the individual alternative merchants 204 and the merchant 202 offer a same sub-set of services, such as Mexican food, Italian food, or American food, as sub-sets of food services, or manicures, pedicures, or massages, as sub-sets of spa/beauty services, etc. In some examples, the deal selection module 120 may prioritize the one or more deals 130 based at least in part on user preferences 132. That is, the deal selection module 120 may access individual deals 130 of the one or more deals 130 that are the most relevant for the user 106 based on the user preferences 132 and may send the individual deals 130 to the presentation module 126 before sending individual deals 130 of the one or more deals 130 that are less relevant for the user 106.

In at least some examples, the deal selection module 120 may prioritize the one or more deals 130 based at least in part on parameters provided by the merchants 110. As described above, the service provider 102 may offer items and/or services for sale on behalf of multiple merchants 110. Generally, the service provider 102 has a limited number of opportunities to recommend a deal to a user 106. Therefore, the service provider 102 may prioritize deals based at least in part on a bidding system. For instance, some merchants 110 may bid for and/or pay a premium for having their deals be presented to users 106 before other deals 130 or for having their deals be placed in a viewing position that may be more optimal than other deals 130. Additionally, or alternatively, some merchants 110 may establish a time of day or a length of time for presenting their deals 130. Accordingly, the deal selection module 120 may take such parameters into consideration when selecting, ranking, and/or accessing the one or more deals 130.

In additional and/or alternative examples, such as when the deal selection module 120 receives an indication that the user 106 is located within a predetermined distance of the geographical location of a merchant 110 or an occurrence of a noteworthy date in the user's 106 calendar information, the deal selection module 120 may identify one or more deals 130 based at least in part on the user preferences 132, the geographical location of the user 106, and/or a length of a waiting list for merchants 110 offering the one or more deals 130. For instance, if the deal selection module 120 receives an indication that a user 106 is within a predetermined distance of a merchant 110, the deal selection module 120 may identify one or more deals 130 offered by one or merchants 110 that are located within a predetermined distance of the user 106 and/or one or more merchants 110 that have no waiting list, awaiting list with a number of groups below a predetermined threshold, and/or a waiting list with an estimated wait time below a predetermined threshold. The deal selection module 120 may also consider user preferences 132 in identifying the one or more deals 130. For example, if the user preferences 132 indicate that the user 106 prefers Italian food over Mexican food, the deal selection module 120 may select deals 130 for Italian food instead of or before deals 130 for Mexican food.

The presentation module 126 may receive deals 130 from the deal selection module 120. The presentation module 126 may offer one or more deals 130 to the user 106. The deals 130 may be offered to the users 106 in any manner, such as via a site (e.g., a website), an e-mail message, an application associated with a user device 108, a text message, a telephone call, a social network, or any other manner.

The feedback module 128 may receive feedback data 214 from the user device 108. The feedback data 214 may indicate whether the user 106 acquired any of the deals 130 offered by the presentation module 126. The feedback module 128 may send the feedback data 214 to the waitlist module 124 and/or the communications module 134. The waitlist module 124 may leverage the feedback data 214 to determine whether to remove the user 106 from the waiting list or maintain a current position of the user 106 on the waiting list for the merchant 110. For instance, the feedback data 214 may include an indication that the user 106 acquired at least one deal 130 of the deals 130 presented by the presentation module 126. The at least one deal 130 may be offered by one of the alternative merchants 204. Based at least in part on receiving the feedback data 214, the feedback module 128 may send the feedback data 214 to the waitlist module 124 and the waitlist module 124 may remove the user 106 (and his or her group) from the waiting list for the merchant 202. The waitlist module 124 may send the user 106 a prompt via the user device 108 requesting that the user 106 confirm that he or she would like to be removed from the waiting list for the merchant 202.

Alternatively, the communications module 134 may leverage the feedback data 214 to select one or more deals 130 to present to the user 106. Based at least in part on receiving the feedback data 214 (e.g., that the user 106 acquired a deal 130), the deal selection module 124 may select one or more deals 130 offered by merchant 202. The deal selection module 124 may send the one or more deals 130 offered by the merchant 202 to the presentation module 126 and the presentation module 126 may offer the one or more deals 130 to the user 106. If the user 106 acquires at least one or more of the deals 130 offered by the merchant 202, the feedback module 128 may receive feedback data 214 indicating that the user 106 acquired at least one or more of the deals 130. The feedback module 128 may provide the feedback data 214 to the waitlist module 124 and the waitlist module 124 may maintain the current position of the user 106 on the waiting list for the merchant 202. The waitlist module 124 may send the user 106 a prompt via the user device 108 requesting that the user 106 confirm that he or she would like to stay on the waiting list for the merchant 202.

Figure 3:
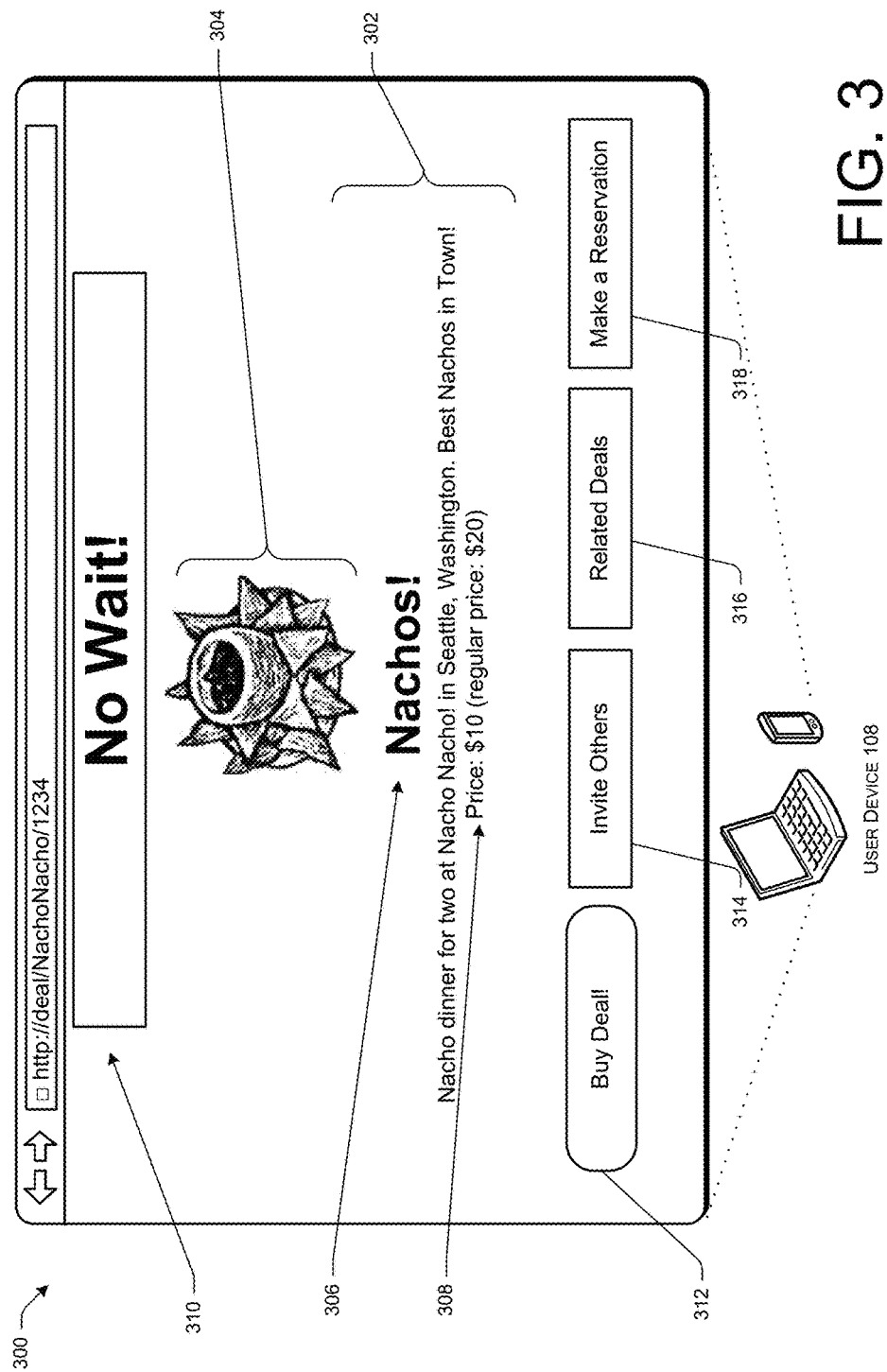
FIG. 3 is a diagram showing an example user interface that enables a user to acquire a deal offered by a service provider on behalf of merchants.

FIG. 3 is a diagram showing an example user interface 300 that enables a user 106 to acquire a deal 130 offered by a service provider 102 on behalf of merchants 110. The user interface 300 illustrated in FIG. 3 may be presented to users 106 utilizing any communication channel, such as an e-mail message, a site (e.g., website) associated with the service provider 102, a text message, a social network site, an application that is associated with the service provider 102 and that resides on user device(s) 108 of the users 106, etc. In at least some examples, the example user interface 300 may be presented to a user 106 based at least in part on receiving waitlist data 212 indicating that the user 106 has been added to a waiting list of a merchant 110. In other examples, the example user interface 300 may be presented to a user 106 based at least in part on another triggering event (e.g., determining that the user 106 is within a threshold distance of a merchant 110, occurrence of a noteworthy date in a calendar associated with a user 106, etc.). As described above, if the user 106 acquires a deal 130 like the one illustrated by example user interface 300, the user 106 may be removed from the waiting list of a merchant 110 (e.g., merchant 202) if the deal 130 is offered by an alternative merchant 110 (e.g., alternative merchant(s) 204). Alternatively or additionally, a new deal offered by the merchant 110 (e.g., merchant 202) may be presented to the user 106 via an example user interface 300.

As shown, the user interface 300 may include deal information 302 that describes the deal 130 and an image, photo, etc., 304 that represents the items associated with the deal 130 (i.e., a plate of nachos for a "nacho" deal 130, a bottle of wine and a glass for a "wine tasting" deal 130). For instance, the deal information 302 may include the item(s) 306 (e.g., products, services, etc.) being offered in the deal 130. For instance, for the purposes of FIG. 3, the item 306 featured in the deal 130 is a "nacho" dinner. The item 306 also includes descriptive information that explains what the "nacho" dinner entails. Here, the deal 130 specifies the location in which the deal 130 is to be redeemed (e.g., Seattle, Wash.), the merchant 110 associated with the deal 130 (e.g., Nacho Nacho!), and other information. The user interface 300 also includes information relating to the price 308 of the deal 130 (e.g., $20) and whether the merchant 110 has a waiting list and/or a length of a waiting list (e.g., "No Wait!" 310).

A user 106 may acquire the deal 130 by actuating a "Buy Deal!" button 312. Before, during, or after the user 106 acquires the deal 130, the user 106 may provide additional information relevant to the acquisition of the deal 130, such as how many deals 130 the user 106 would like to acquire, relevant payment information, personal preferences, a number of users 106 in his or her group, etc. At 314, before, during, or after the user 106 acquires the deal 130, the user 106 may also invite other users 106, who may be in a same group as the user 106, to acquire the deal 130 and to redeem the deal 130 with the user 106. The user 106 may input contact information (e.g., e-mail addresses, telephone numbers, unique identifiers, etc.) for the other users 106, which may cause the service provider 102 to send a notification to those other users 106. The other users 106 may then have the opportunity to acquire the same deal 130 as the user 106. At 316, before, during, or after the user 106 acquires the deal 130, the user 106 may request to view related deals 130. Related deals may include deals 130 relating to transportation services for transporting the user 106 (and his or her group) to the merchant 110 offering the presented deal 130, other deals 130 associated with the same merchant 110, other deals 130 offered by merchants 110 offering similar services to the deal 130, etc. At 318, the user 106 may elect to make a reservation with the merchant 110 offering the deal 130.

Moreover, the user interface 300 is one example of a user interface 300 that facilitates the acquisition of deals 130, and any other presentation or configuration may be used.

FIGS. 4-8 describe example processes of accessing deals 130 to present to a user 106 based at least in part on adding the user 106 to a waiting list associated with a merchant 110. The example processes are described in the context of the environment of FIGS. 1-3 but are not limited to those environments. The processes are illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

Figure 4:
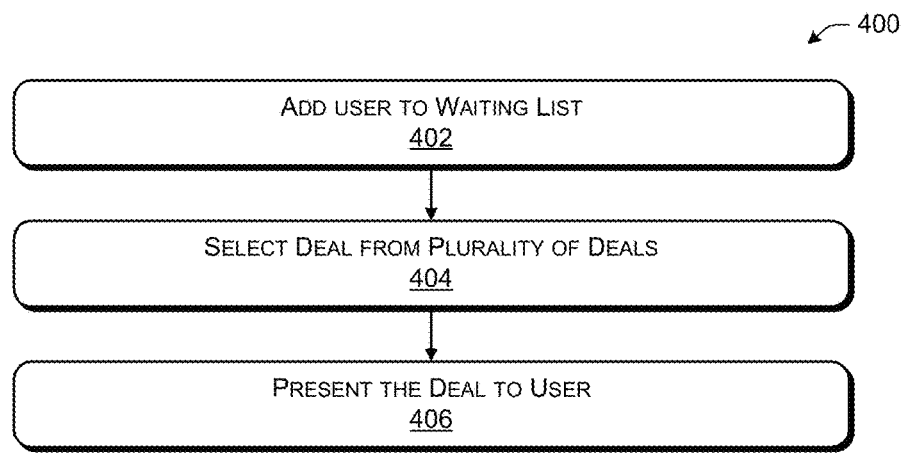
FIG. 4 is a flow diagram showing accessing deals to present to a user based at least in part on adding the user to a waiting list associated with a merchant.

FIG. 4 is a flow diagram 400 showing accessing deals 130 to present to a user 106 based at least in part on adding the user 106 to a waiting list associated with a merchant 110.

Block 402 illustrates adding a user 106 to a waiting list. The waitlist module 124 may control and/or maintain waiting lists for each of the merchants 110 (e.g., merchant 202 and/or alternative merchants 204). The waitlist module 124 may leverage the presence data 210 for controlling waiting lists associated with the merchants 110 (e.g., merchant 202 and/or alternative merchants 204). The waitlist module 124 may control the waiting lists by adding groups to the waiting lists. In at least one example, the waitlist module 124 may receive presence data 210 indicating that the presence module 122 has detected a user 106 at a geographic location of a merchant 110 (e.g., merchant 202). In other examples, the waitlist module 124 may determine that an instant date is a noteworthy date (e.g., birthday, anniversary, special occasion, etc.) per a calendar associated with the user 106. Based at least in part on receiving presence data 210 indicating that the user 106 is at the geographic location of the merchant 202 and/or that an instant date is a noteworthy date, the waitlist module 124 may send a prompt to the user 106 inquiring whether the user would like to be added to the waiting list associated with the merchant 202. The prompt may be provided to the user 106 in any manner, such as via a site (e.g., a website), an e-mail message, an application associated with a user device 108, a text message, a telephone call, a social network, or any other manner. The waitlist module 124 may receive waitlist data 212 indicating that the user 106 wants to be added to the particular waiting list. Responsive to receiving the indication, the waitlist module 124 may add the user 106 to the waiting list for the merchant 202.

Block 404 illustrates selecting a deal 130 from a plurality of deals. Based at least in part on receiving waitlist data 212 indicating that the user 106 has been added to a waiting list for a merchant 202, the deal selection module 120 may select one or more deals 130 for offering to the user 106. In at least one example, based at least in part on receiving waitlist data 212 indicating that individual alternative merchants 204 of the one or more alternative merchants 204 have no waiting lists, have waiting lists that have fewer groups waiting than the waiting list for the merchant 202, or have waiting lists with estimated wait times below a predetermined time, the deal selection module 120 may select one or more deals 130 offered by the individual alternative merchants 204. The deal selection module 120 may select the one or more deals 130 offered by the one or more alternative merchants 204 based at least in part on whether the individual alternative merchants 204 are located within a predetermined distance of the merchant 202, whether the individual alternative merchants 204 offer the same services as the merchant 202, whether the individual alternative merchants 204 offer the same genre of services as the merchant 202, whether the individual alternative merchants 204 offer services that match the user preferences 132, etc. The deal selection module 120 may send the one or more deals 130 offered by the one or more alternative merchants 204 to the presentation module 126.

Block 406 illustrates presenting the deal 130 to the user 106. The deal selection module 120 may access the deals 130 and send the deals 130 to the presentation module 126. The presentation module 126 may offer one or more deals 130 to the user 106. The one or more deals 130 may be offered to the users 106 in any manner, such as via a site (e.g., a website), an e-mail message, an application associated with a user device 108, a text message, a telephone call, a social network, or any other manner. The deals 130 may be presented to the users 106 as shown in FIG. 3, for example.

Figure 5:
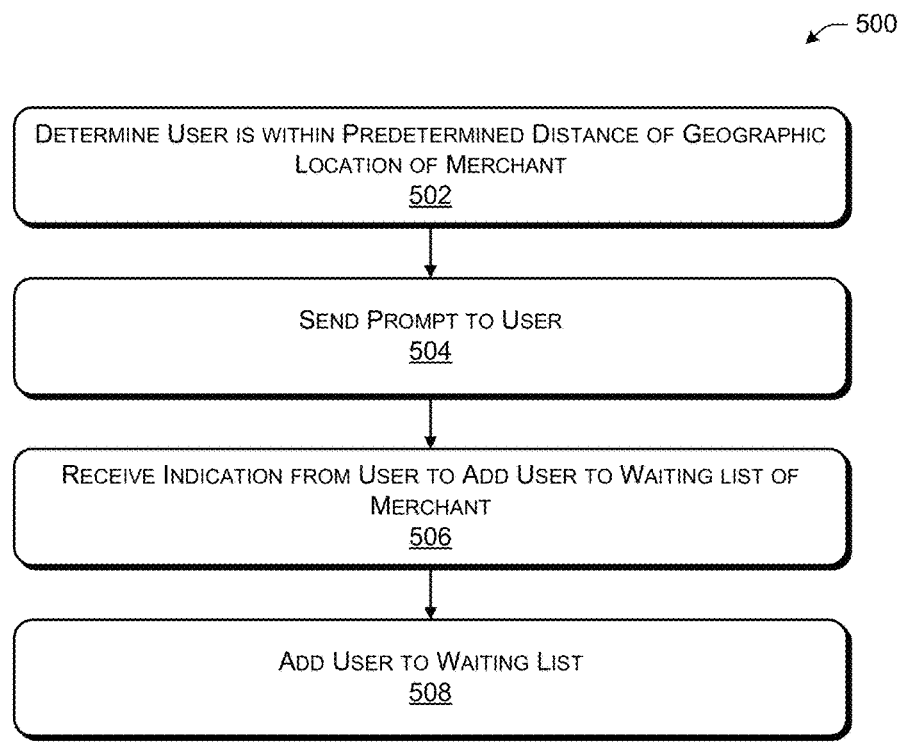
FIG. 5 is a flow diagram showing managing a waiting list associated with a merchant.

FIG. 5 is a flow diagram 500 showing an example of controlling a waiting list associated with a merchant 110. Block 502 illustrates determining that a user 106 is within a predetermined distance of a geographic location of a merchant 110. The presence module 122 may determine that the user 106 is within the predetermined distance of the geographic location of the merchant 202, as described above. In additional or alternative examples, the waitlist module 124 may determine an instant date is a noteworthy date in a calendar associated with a user 106. Block 504 illustrates sending a prompt to the user 106. Based at least in part on determining that a user 106 is within the predetermined distance of the geographic location of the merchant 110 and/or an instant date is a noteworthy date in a calendar associated with a user 106, the waitlist module 124 may send a prompt to the user 106 inquiring whether the user would like to be added to the waiting list associated with the merchant 202. The prompt may be provided to the user 106 in any manner, such as via a site (e.g., a website), an e-mail message, an application associated with a user device 108, a text message, a telephone call, a social network, or any other manner. In some examples, the prompt may include a request for a number of people in the user's 106 group and additional information (e.g., dining preferences, special instructions, etc.). Block 506 illustrates receiving an indication from the user 106 to add the user 106 to the waiting list. The waitlist module 124 may receive waitlist data 212 indicating that the user 106 wants to be added to the particular waiting list. Responsive to receiving the indication, the waitlist module 124 may add the user 106 to the waiting list for the merchant 202, as illustrated in Block 508.

Figure 6:
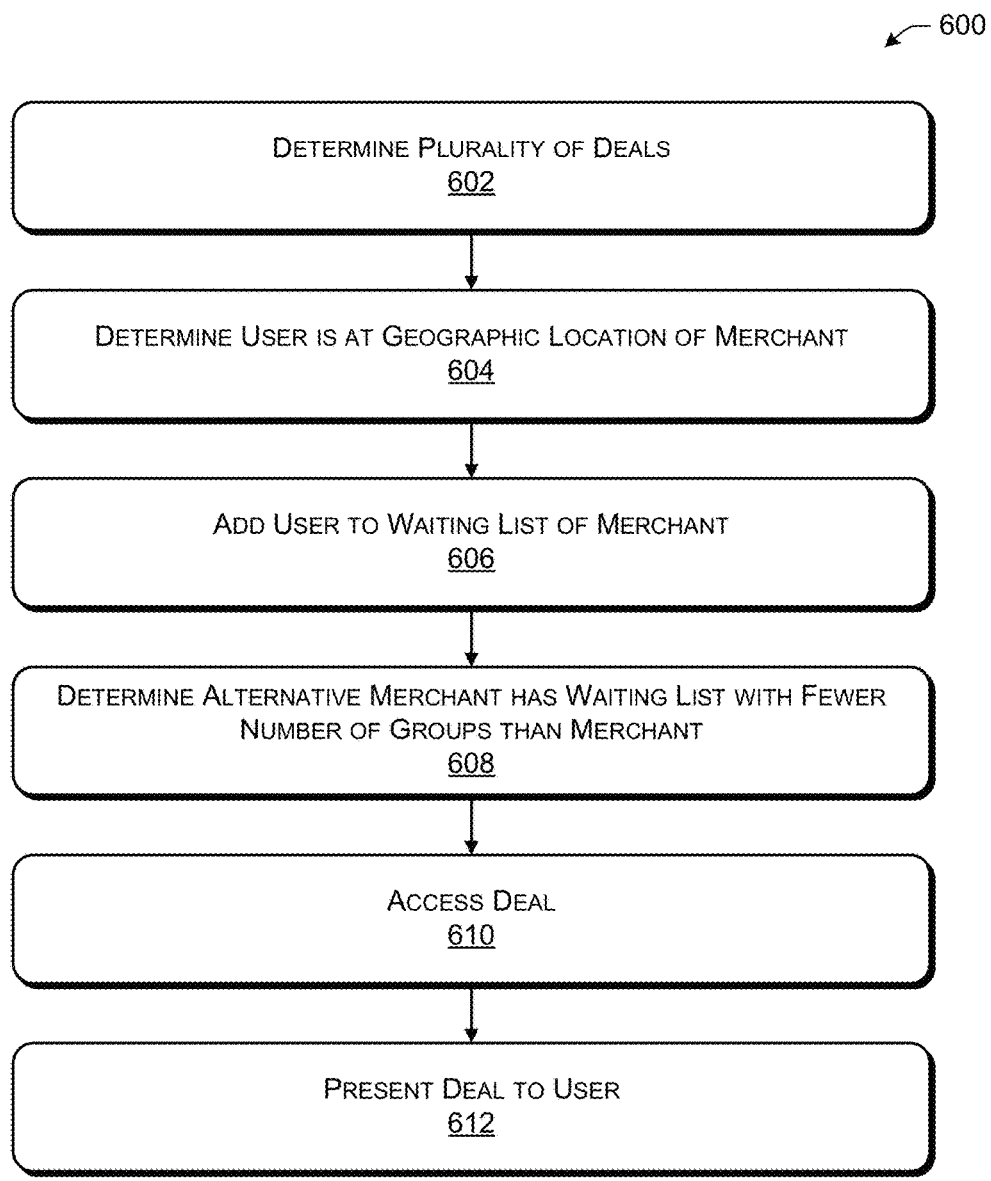
FIG. 6 is a flow diagram showing presenting deals to a user based at least in part on adding the user to a waiting list associated with a merchant.

FIG. 6 is a flow diagram 600 showing presenting deals 130 to a user 106 based at least in part on adding the user 106 to a waiting list associated with a merchant 110.

Block 602 illustrates determining a plurality of deals 130. As described above, the deal selection module 120 may maintain or at least be associated with one or more deals 130. Merchants 110 (e.g., merchant 202 and the one or more alternative merchants 204) may provide deals 130 to the service provider 102 for ultimately presenting the deals 130 to the users 106. Block 604 illustrates determining that a user 106 is at a geographic location of a merchant 110 (e.g., merchant 202). The presence module 122 may determine that the user 106 is at the geographic location of the merchant 110 (e.g., merchant 202), as described above.

Block 606 illustrates adding the user 106 to the waiting list of the merchant 202. The waitlist module 124 may control waiting lists for each of the merchants 110 (e.g., merchant 202 and/or alternative merchants 204). The waitlist module 124 may control the waiting lists by adding groups to the waiting lists. In at least one example, the waitlist module 124 may receive waitlist data 212 indicating that a user 106 is present at a geographic location of a merchant 202. The waitlist module 124 may send a prompt to the user 106 inquiring whether the user would like to be added to the waiting list associated with the merchant 202. The waitlist module 124 may receive waitlist data 212 indicating that the user 106 wants to be added to the waiting list. Responsive to receiving the indication, the waitlist module 124 may add the user 106 to the waiting list for the merchant 202. As described above, a user 106 may also be added to a waiting list for a merchant 110 (e.g., 202) based at least in part on an occurrence of an event (e.g., a noteworthy event in a calendar associated with a user 106), etc.

Block 608 illustrates determining that an alternative merchant 204 has a waiting list with fewer groups waiting than the merchant 202. The waitlist module 124 may monitor waiting lists associated with one or more merchants 110. In at least one example, the waitlist module 124 may determine that at least one of the one or more alternative merchants 204 has no waiting list or has fewer groups on a waiting list than the merchant 202. Additionally or alternatively, the waitlist module 124 may determine that at least one of the one or more alternative merchants 204 has an estimated wait time below a predetermined time. Based at least in part on determining that at least one of the one or more alternative merchants 204 has no waiting list, has fewer groups on a waiting list than the merchant 202, or has an estimated wait time below a predetermined time, the waitlist module 124 may send waitlist data 212 to the communications module 134 indicating that at least one of the one or more alternative merchants 204 has no waiting list, has fewer groups on a waiting list than the merchant 202, or has an estimated wait time below a predetermined time.

Block 610 illustrates accessing a deal 130. The deal selection module 120 may receive waitlist data 212 associated with one or more alternative merchants 204. As described above, the waitlist data 212 may indicate that at least one of the one or more alternative merchants 204 has no waiting list, has a waiting list that is shorter than the waiting list for the merchant 202, or has an estimated wait time below a predetermined threshold. Based at least in part on receiving the waitlist data 212, the deal selection module 120 may select one or more deals 130 offered by an alternative merchant 204 and may send the one or more deals 130 offered by the alternative merchant 204 to the presentation module 126, as described above.

Block 612 illustrates presenting the deal 130 to the user 612. The deal selection module 120 may access the one or more deals 130 and send at least one of the one or more deals 130 to the presentation module 126. The presentation module 126 may offer the at least one deal 130 to the user 106. The at least one deal 130 may be offered to the users 106 in any manner, such as via a site (e.g., a website), an e-mail message, an application associated with a user device 108, a text message, a telephone call, a social network, or any other manner. Deals 130 may be presented to the users 106 as shown in FIG. 3, for example.

Figure 7:
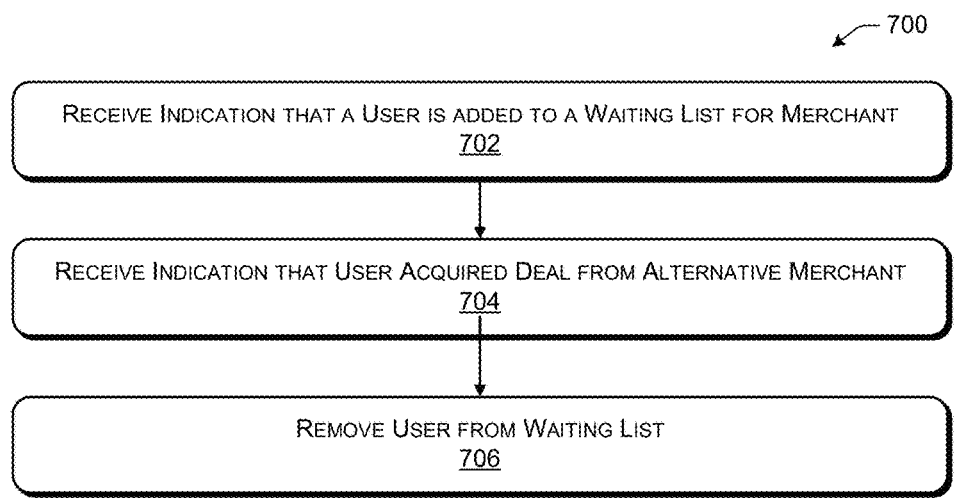
FIG. 7 is a flow diagram showing removing a user from a waiting list based at least in part on receiving an indication that the user acquired a deal offered by an alternative merchant.

FIG. 7 is a flow diagram 700 showing removing a user 106 from a waiting list based at least in part on receiving an indication that the user 106 acquired a deal 130 offered by an alternative merchant 204. The waitlist module 124 may control the waiting lists by adding and/or removing groups from the waiting lists, as described above. Block 702 illustrates receiving an indication that a user 106 is added to a waiting list for a merchant 202. As described above, In at least one example, the waitlist module 124 may receive waitlist data 212 indicating that a user 106 is at a geographic location of a merchant 202. In other examples, a user 106 may be added to a waiting list for a merchant 110 (e.g., merchant 202) based at least in part on an occurrence of an event (e.g., a noteworthy event in a calendar associated with a user 106), etc. Block 704 illustrates receiving an indication that a user 106 acquired a deal 130. In at least one example, the waitlist module 124 may receive feedback data 214 from the feedback module 128 that the user acquired a deal 130 from one of the one or more alternative merchants 204. Block 706 illustrates removing the user 106 from the waiting list. Based at least in part on receiving the feedback data 214, the waitlist module 124 may remove the user 106 (or the group associated with the user 106) from the waiting list. The waitlist module 124 may send the user 106 prompt via the user device 108 requesting that the user 106 confirm that he or she would like to be removed from the waiting list for the merchant 202.

Figure 8:
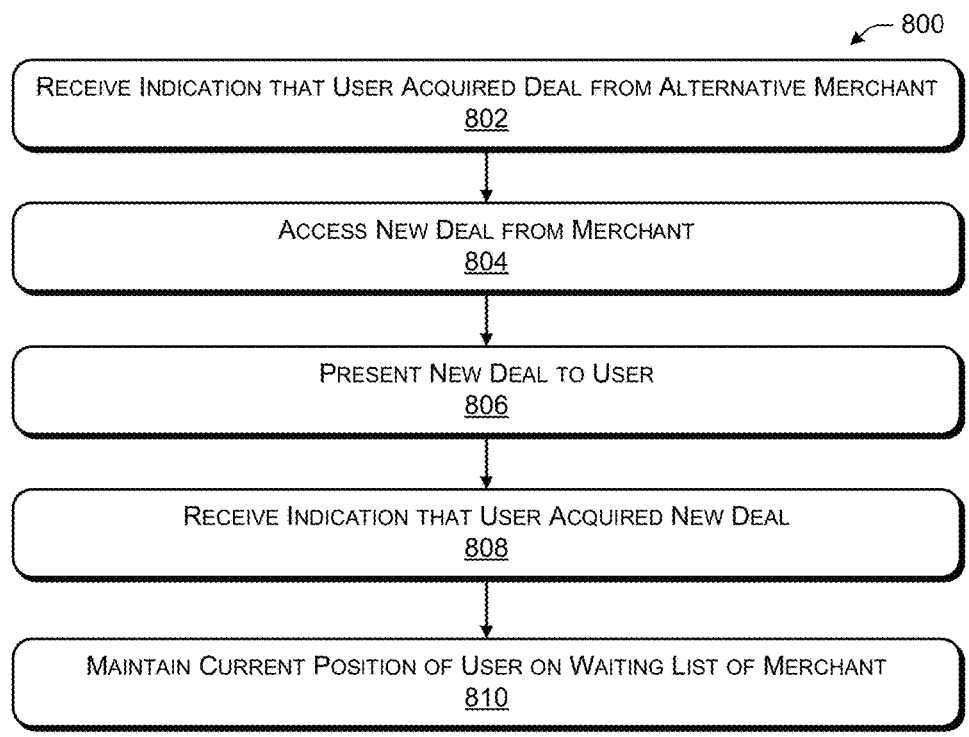
FIG. 8 is a flow diagram showing maintaining a current position of a user on a waiting list based at least in part on receiving an indication that the user acquired a new deal from the merchant.

FIG. 8 is a flow diagram 800 showing maintaining a current position of a user on a waiting list based at least in part on receiving an indication that the user 106 acquired a deal 130.

Block 802 illustrates receiving an indication that a user 106 acquired a deal 130 from at least one of the one or more alternative merchants 204. The feedback module 128 may send feedback data 214 to the communications module 134 indicating that the user 106 acquired a deal 130 from an alternative merchant 204.

Block 804 illustrates accessing at least one deal 130 (e.g., a new deal) from the merchant 202 where the user 106 is already on the waiting list. Based at least in part on receiving the feedback data 214, the deal selection module 124 may select one or more deals 130 (e.g., new deals) offered by merchant 202.

Block 806 illustrates presenting a new deal to the user 106. The deal selection module 124 may send the one or more new deals to the presentation module 126 and the presentation module 126 may offer the one or more new deals to the user 106, as described above.

Block 808 illustrates receiving an indication that the user 106 acquired the new deal. If the user 106 acquires at least one or more of the new deals, the feedback module 128 may receive feedback data 214 indicating that the user acquired at least one or more of the new deals. The feedback module 128 may provide the feedback data 214 to the waitlist module 124.

Block 810 illustrates maintaining a current position of the user 106 on the waiting list associated with the merchant 202. Based at least in part on receiving an indication that the user 106 acquired a new deal from the merchant 202, the waitlist module 124 may maintain a current position of the user 106 on the waiting list for the merchant 202. The waitlist module 124 may send the user 106 a prompt via the user device 108 requesting that the user 106 confirm that he or she would like to stay on the waiting list for the merchant 202.

In closing, although the various examples have been described in language specific to structural features and/or methodical acts, it is to be understood that the subject matter defined in the appended representations is not necessarily limited to the specific features or acts described. Rather, the specific features and acts are disclosed as example forms of implementing the claimed subject matter.

What is claimed is:

1. One or more non-transitory computer-readable media encoded with instructions that, when executed by a processor, configure a computer to perform acts comprising:
   determining a plurality of deals offered by a plurality of merchants;
   determining whether a user device associated with a user has established a connection to a wireless network of a merchant of the plurality of merchants;
   determining, based on whether data has been received at the computer from the user device, whether the user device has scanned a QR code of the merchant;
   determining that the user device is within a first predetermined distance of a geographic location of the merchant based on a first determination of the user device establishing the connection to the wireless network of the merchant or a second determination of the user device scanning the QR code of the merchant;
   based at least in part on determining that the user device is within the first predetermined distance of the geographic location of the merchant, adding the user to a first waiting list associated with the merchant, the first waiting list including a first number of groups;
   based at least in part on adding the user to the first waiting list:
      determining an alternative merchant of the plurality of merchants that is associated with a second waiting list, the second waiting list including a second number of groups that is less than the first number of groups;
      accessing a deal of the plurality of deals that is offered by the alternative merchant; and
      causing presentation of the deal to the user via the user device, wherein causing presentation of the deal includes presenting a user interface element that is selectable to acquire the deal via a display of the user device;
   determining, based at least in part on feedback data indicating selection of the user interface element, that the user acquired the deal; and
   based at least in part on determining that the user acquired the deal, providing a prompt to the user inquiring at least one of whether the user would like to remain on the first waiting list or be removed from the first waiting list.

2. The one or more non-transitory computer-readable media as recited in claim 1, wherein accessing the deal comprises selecting the deal based at least in part on:
   a geographic location of the alternative merchant being within a second predetermined distance of the geographic location of the merchant;
   a service offered by the alternative merchant being a same service offered by the merchant; or
   the deal matching one or more user preferences associated with the user.

3. The one or more non-transitory computer-readable media as recited in claim 1, wherein the acts further comprise:
receiving an indication to remove the user from the first waiting list; and
based at least partly on the indication, removing the user from the first waiting list.

4. The one or more non-transitory computer-readable media as recited in claim 1, wherein the acts further comprise:
based at least in part on determining that the user acquired the deal, accessing a new deal of the plurality of deals, the new deal being offered by the merchant;
causing presentation of the new deal to the user via the user device;
receiving a second indication that the user acquired the new deal; and
maintaining a current position of the user on the first waiting list.

5. A method comprising:
determining, by a computing device, whether a user device associated with a user has established a connection to a wireless network of a merchant;
determining, by the computing device, based on whether data has been received at the computing device from the user device, whether the user device has scanned a QR code of the merchant;
determining, by the computing device, that the user device is within a predetermined distance of a geographic location of the merchant based on a first determination of the user device establishing the connection to the wireless network of the merchant or a second determination of the user device scanning the QR code of the merchant;
based at least in part on determining that the user device is within the predetermined distance of the geographic location of the merchant, causing, by the computing device, the user to be added to a first waiting list for a service provided by the merchant, the first waiting list having a first number of groups;
determining, by the computing device, an alternative merchant that is associated with a second waiting list, the second waiting list including a second number of groups;
selecting, by the computing device, a deal for an additional service that is offered by the alternative merchant from a plurality of deals;
causing, by the computing device and based at least in part on adding the user to the first waiting list, presentation of the deal to the user via the user device, wherein causing presentation of the deal includes presenting a user interface element that is selectable to acquire the deal via a display of the user device;
determining, based at least in part on feedback data indicating selection of the user interface element, that the user acquired the deal; and
based at least in part on determining that the user acquired the deal, providing a prompt to the user inquiring at least one of whether the user would like to remain on the first waiting list or be removed from the first waiting list.

6. The method of claim 5, further comprising receiving an indication that the user device is within the predetermined distance of the geographic location of the merchant for a predetermined period of time.

7. The method of claim 5, wherein selecting the deal is based at least in part on at least one of:
a geographic location of the alternative merchant being within an additional predetermined distance of the geographic location of the merchant;
the additional service performed by the alternative merchant being a same service as the service offered by the merchant; or
the second number of groups is less than the first number of groups of the first waiting list.

8. The method of claim 5, further comprising:
determining that there are no groups on the second waiting list or that an estimated wait time associated with the second waiting list is at or below a predetermined time; and
causing presentation of a notification to the user indicating that there are no groups on the second waiting list or the estimated wait time.

9. The method of claim 5, further comprising:
determining that the second number of groups ahead of the user on the second waiting list is less than the first number of groups ahead of the user on the first waiting list; and
presenting, via the user device, a notification indicating that the second number of groups ahead of the user on the second waiting list is less than the first number of groups ahead of the user on the first waiting list.

10. The method of claim 5, further comprising removing the user from the first waiting list based at least in part on receiving an indication that:
the user would like to be removed from the first waiting list;
a predetermined period of time since the user was added to the first waiting list has lapsed; or
the user is no longer within the predetermined distance of the geographic location of the merchant.

11. The method of claim 5, further comprising and based at least in part on adding the user to the first waiting list, presenting the user with an option to receive subsequent notifications, the subsequent notifications identifying:
a number of groups that are ahead of the user on the first waiting list; or
a real-time estimation of a wait time for the user.

12. A system comprising:
non-transitory memory;
one or more processors; and
computer-readable instructions stored in the memory and executable by the one or more processors to perform operations comprising:
maintaining waiting lists for a plurality of merchants;
determining whether a user device associated with a user has established a connection to a wireless network of a first merchant of the plurality of merchants;
determining, based on whether data has been received at the system form the user device, whether the user device has scanned a QR code of the first merchant;
determining that the user device is within a predetermined distance of a geographic location of a first merchant based on a first determination of the user device establishing the connection to the wireless network of the first merchant or a second determination of the user device scanning the QR code of the first merchant;
based at least in part on determining that the user device is within the predetermined distance of the geographic location of the first merchant, adding the user to a first waiting list of the waiting lists, the first waiting list associated with the first merchant of the plurality of merchants;

determining that the user is added to the first waiting list;

based at least in part on determining that the user is added to the first waiting list:
  determining a second merchant that is associated with a second waiting list;
  providing the user with an option to receive an update associated with the first waiting list via the user device; and
  causing presentation of a deal of the second merchant via the user device, wherein causing presentation of the deal includes presenting a user interface element that is selectable to acquire the deal via a display of the user device;

determining, based at least in part on feedback data indicating selection of the user interface element, that the user acquired the deal; and based at least in part on determining that the user acquired the deal, providing a prompt to the user inquiring at least one of whether the user would like to remain on the first waiting list or be removed from the first waiting list.

13. The system of claim 12, wherein the operations further comprise:
  based at least in part on adding the user to the first waiting list, accessing user preferences via at least one of a cookie or an authenticated user session; and
  determining, via the user preferences, a specific user preference associated with the user.

14. The system of claim 13, wherein the operations further comprise based at least in part on determining that the user device is within the predetermined distance of the geographic location and before adding the user to the first waiting list:
  sending a prompt to the user device inquiring whether the user would like to be added to the first waiting list; and
  receiving an indication that the user wants to be added to the first waiting list.

15. The system of claim 12, wherein the operations further comprise:
  determining that a current date is denoted as a noteworthy date in a calendar associated with the user; and
  based at least in part on determining the current date is denoted as the noteworthy date in the calendar, adding the user to the first waiting list.

16. The system of claim 12, wherein the operations further comprise selecting the deal based at least in part on determining that the first waiting list has a first number of groups that is greater than a second number of groups included in the second waiting list.

17. The system of claim 12, wherein the operations further comprise selecting the deal based at least in part on determining that a geographic location of the second merchant is within an additional predetermined distance of the geographic location of the first merchant.

18. The system of claim 12, wherein the operations further comprise selecting the deal based at least in part on determining that the second merchant provides a same service as the first merchant.

19. The system of claim 18, wherein the operations further comprise selecting the deal based at least in part on determining that the second merchant provides a same genre of the same service as the first merchant.

20. The system of claim 12, wherein the operations further comprise removing the user from the first waiting list based at least in part on receiving an indication that:
  the user device is no longer within the predetermined distance of the geographic location of the first merchant; or
  the user would like to be removed from the first waiting list.

* * * * *